United States Patent
York et al.

(10) Patent No.: US 6,571,191 B1
(45) Date of Patent: May 27, 2003

(54) METHOD AND SYSTEM FOR RECALIBRATION OF AN ELECTRONIC CONTROL MODULE

(75) Inventors: Christopher S. York, Greenwood, IN (US); Dale E. Thompson, Indianapolis, IN (US); Michele S. Roberts, Greenwood, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 09/179,788

(22) Filed: Oct. 27, 1998

(51) Int. Cl.⁷ .............................................. G06F 19/00
(52) U.S. Cl. ......................... 702/107; 702/104; 702/85; 702/188
(58) Field of Search .......................... 702/107, 85, 123, 702/119, 183, 184, 186–188, FOR 103, FOR 104, FOR 134, FOR 156–FOR 163, FOR 170, FOR 171, 104; 701/29, 31–33, 1, 35, 102, 99, 115, 101, 2, 30, 34; 700/86; 713/183, 187, 188, 193, 194, 202, 184; 705/56–58; 717/11; 714/758, 799, 804, 819–821; 340/5.54, 5.85; 362/85

(56) References Cited

U.S. PATENT DOCUMENTS

| | | | | |
|---|---|---|---|---|
| 4,996,643 A | | 2/1991 | Sakamoto et al. ............. 701/32 |
| 5,005,129 A | | 4/1991 | Abe et al. ...................... 701/31 |
| 5,010,487 A | | 4/1991 | Stonehocker ................. 701/29 |
| 5,041,976 A | | 8/1991 | Marko et al. ................. 701/29 |
| 5,091,939 A | * | 2/1992 | Cole et al. ................... 713/183 |
| 5,209,560 A | * | 5/1993 | Taylor et al. ................. 362/85 |
| 5,214,582 A | | 5/1993 | Gray ........................... 701/33 |
| 5,318,449 A | | 6/1994 | Schoell et al. ............... 434/305 |
| 5,414,626 A | | 5/1995 | Boorse et al. ................ 701/32 |
| 5,426,585 A | | 6/1995 | Stepper et al. ................ 702/85 |
| 5,432,904 A | | 7/1995 | Wong ............................ 705/4 |
| 5,473,540 A | | 12/1995 | Schmitz ........................ 701/1 |
| 5,490,065 A | | 2/1996 | Hoenninger et al. .......... 701/29 |
| 5,506,772 A | | 4/1996 | Kubozono et al. ............ 701/29 |
| 5,506,773 A | | 4/1996 | Takaba et al. ................. 701/29 |
| 5,528,496 A | | 6/1996 | Brauer et al. ................. 701/32 |
| 5,537,544 A | * | 7/1996 | Morisawa et al. .......... 713/183 |
| 5,541,840 A | | 7/1996 | Gurne et al. .................. 701/33 |
| 5,555,498 A | | 9/1996 | Berra et al. ................... 701/33 |
| 5,557,268 A | | 9/1996 | Hughes et al. .............. 340/933 |
| 5,606,663 A | * | 2/1997 | Kadooka ..................... 713/202 |
| 5,648,898 A | | 7/1997 | Moore-McKee et al. ..... 700/86 |
| 5,717,595 A | | 2/1998 | Cherrington et al. ....... 705/400 |
| 5,719,941 A | * | 2/1998 | Swift et al. ................ 340/5.54 |
| 5,734,718 A | * | 3/1998 | Prafullchandra ............ 713/183 |
| 5,737,711 A | | 4/1998 | Abe ............................ 701/29 |
| 5,757,645 A | | 5/1998 | Schneider et al. ............ 701/29 |
| 5,774,545 A | * | 6/1998 | Raghavachari .............. 713/183 |
| 5,787,367 A | | 7/1998 | Berra ............................ 701/1 |
| 5,978,958 A | * | 11/1999 | Tanaka et al. .............. 714/804 |
| 6,073,214 A | * | 6/2000 | Fawcett ....................... 717/11 |
| 6,141,683 A | * | 10/2000 | Kraml et al. ................. 717/11 |

\* cited by examiner

Primary Examiner—Hal Wachsman
(74) Attorney, Agent, or Firm—Barnes & Thornburg

(57) ABSTRACT

A system for recalibrating a remote electronic control system, such as an engine control module (ECM), includes a computer maintaining a database of calibration upgrades and a history of recalibrations for specifically identified ECMs. Software routines determine whether the recalibration history includes the latest calibration upgrades, and if not, automatically downloads those upgrades to the ECM. The software also compares an access password for the ECM to entries in a library of acceptable passwords, and if a match therebetween is found access to the ECM is allowed for downloading recalibration information thereto. The system also contemplates a protocol for verifying the integrity of data downloaded from the ECM to the computer. Types of data susceptible to error are identified, and the downloaded information is evaluated to determine if the susceptible types of data are present. If so, and if correctable errors exist, the downloaded trip information is corrected.

7 Claims, 8 Drawing Sheets

METHOD AND SYSTEM FOR RECALIBRATION OF AN ELECTRONIC CONTROL MODULE

BACKGROUND OF THE INVENTION

The present invention relates to electronic control systems for devices, such as engine control modules for vehicles. More specifically, the invention concerns systems and methods for the re-calibration of the electronic control systems.

Electronic controls for remote devices are prevalent. In recent years, electronic controls have been applied to vehicles, and particularly to internal combustion engines used in a wide range of applications. The electronic control systems for the engine, or engine control modules (ECM), can monitor and control all functions of the engine.

To assist vehicle fleet owners in making the most economical use of their vehicles, the typical ECM includes a memory for recording the performance data for the engine operation. This data can then be extracted from the ECM by a diagnostic or service tool via a data uplink. In some cases, the service tool plugs directly into a port of the ECM and issues commands to the ECM to download data from the local memory. In other cases, an optical, infrared or RF port can be provided for remote transmission of the data to the service tool.

For some electronic control systems, a service tool can be used to reprogram the electronic controller, or in the case of a vehicle engine, the ECM. These field-programmable ECMs have enabled product enhancements to be made at a greatly reduced cost. For example, a single generic control module can be reprogrammed at various times for many different applications, without any changes to the physical configuration of the module. For instance, a truck may have a different engine rating for use as a long-haul vehicle versus use as a short-haul vehicle. These different ratings may require that the engine have different calibrations between the two applications. If the truck is changed from one use to the other, changes in engine settings can be transmitted to the ECM through the service tool directly by the tool operator. In other instances, the changes to the electronic control system, or ECM, can be downloaded to the service tool from an off-site location. This downloaded information can then be uploaded to the ECM at the location of the vehicle.

With these prior systems, a highly trained and knowledgeable service technician is required to recalibrate the electronic control system, depending on the desired application of the control system. The additional manpower required to perform recalibrations on an entire fleet of vehicles can be expensive. In addition, the manual recalibration process can be very time consuming; taking fleet vehicles out of commission for long periods of time. Consequently, there remains a need for a system and method that permits recalibration of remote electronic control systems, such as ECMs, that are more economical and efficient.

SUMMARY OF THE INVENTION

The present invention addresses the needs left unmet by prior recalibration systems and techniques. In one aspect of the invention, a fleet manager development tool, or computer, is provided with a data base containing information about the current calibration of existing electronic control systems. The fleet computer also maintains a database of new or updated calibrations for the electronic control system or the controlled component. In the case of a fleet of vehicles, the electronic control system can be an ECM that monitors and controls the operation of the vehicle engine.

In one feature of the invention, a vehicle can automatically initiate an upload/download sequence performed by the fleet computer. The sequence can be conducted with the aid of a separate recalibration tool that provides the data link between the fleet computer and the vehicle ECM. This upload/download sequence can be instituted when the vehicle enters a service area. A software routine resident on the fleet computer acknowledges the presence of the vehicle and commences routines for downloading data from the vehicle ECM and/or recalibrating the ECM and/or engine. A visual display in the service area directs the vehicle operator to perform a few simple acts to commence the upload/download process.

In accordance with one embodiment of the present invention, the software resident on the fleet computer can direct the upload of user-requested trip information from the vehicle ECM. If a recalibration is requested, either automatically or by the fleet manager, the software interrogates the ECM for the serial number of the associated controlled component, in this case the vehicle engine. This engine serial number is used to extract the recalibration history for the engine from a database contained in the fleet computer. The most recent calibration entry for the engine is identified and compared against a table of updated recalibration entries, also maintained by the fleet computer.

The table of recalibration entries can be obtained from a central site, such as the engine manufacturer. In one aspect of the invention, the engine manufacturer can make available updated calibrations for the engines that the manufacturer produces. These updated calibrations can be due to improvements in the engine control routines, the addition of new applications for existing engines, or the like. This updated calibration information can be downloaded by the fleet manager in a variety of ways and stored in memory for later reference.

If the extracted calibration history for the particular engine includes the most recent calibration update, no further recalibration is required. On the other hand, in accordance with the present invention, the absence of the manufacturer's most recent calibration from the engine's calibration history signals the fleet computer software to download the new calibration information to the electronic control system, or ECM. When the new information is downloaded, the calibration history for the engine is automatically updated and stored in the fleet computer database.

In a further feature of the invention, access to the ECM is limited to prevent unauthorized modifications to the engine control data or routines. Each ECM maintains a password in its local memory. At the fleet computer, a password library is maintained in memory that includes a series of acceptable passwords. In some embodiments, the password library can include a limited number of passwords used in chronological order. In accordance with this aspect of the invention, the ECM password is compared to every password in the library, not just the most recently used password. If a match is found, access to the ECM is granted, otherwise the software issues an error message and abandons the recalibration process. When access is granted, the newest password is loaded into the ECM for future security checks.

A further feature of the invention addresses the integrity of data uploaded from the ECM. In some cases, data or program errors are known to exist in vehicle controllers that may not have been corrected. The present invention contemplates software executed by the fleet computer that evaluates certain suspect data—i.e., data that is known to have the potential for being corrupt or erroneous. The suspect data is reviewed to determine if certain indicia are present that indicate the data to be corrupt. If the indicia are present, a further determination is made as to whether the data error is correctable. Again, it is known in advance what data errors can and cannot be fixed, as well as the appropriate fixes, if they exist. Correctable errors are address by the software and non-correctable errors can result in nulling the affected data. In one specific feature of the invention, to the extent that the corrupt data is a result of software errors, the affected software is updated or corrected to prevent future occurrences of the corrupt data.

The present invention contemplates a software-based system for recalibrating an electronic control system, such as an ECM, for performing security checks and for evaluating the integrity of data uploaded from the ECM. This same software can be accessed by the fleet manager to administer the database of calibration information used in other subroutines. For example, the fleet manager can select certain available calibrations to be assigned to particular ECMs in the vehicle fleet. In addition, the software allows the fleet manager to define and assign various adjustment sets to vehicles and engines in the fleet. The adjustment sets provided further flexibility in controlling the performance of the engine or vehicle, and tailor the nature of the trip information obtained from the vehicle. The adjustment set updates can be applied to the vehicle ECM using the same protocol as applied to the recalibration data.

It is one object of the present invention to provide a substantially automatic software-based system and method for recalibration of an electronic control system. A further object resides in aspects that verify security features associated with the control system to prevent unauthorized modification or tampering.

One benefit of the present invention is that highly skilled technicians or personnel are not required to effect recalibration of a control system, such as an ECM. A further benefit is attained by features of the invention that permit automatic updating of the necessary calibration and adjustment changes, as well as access passwords and data integrity information.

These and other objects and benefits can be discerned from the following written description of preferred embodiments of the invention, together with the accompanying figures.

DESCRIPTION OF THE DRAWINGS

FIG. 12 is a pictorial representation of screen displays for defining adjustment sets to be used with the system depicted in the flow charts of FIGS. 4–7.

FIG. 13 is a pictorial representation of screen displays for defining adjustment sets to be used with the system depicted in the flow charts of FIGS. 4–7.

DESCRIPTION OF THE PREFERRED EMBODIMENTS

Figure 1:
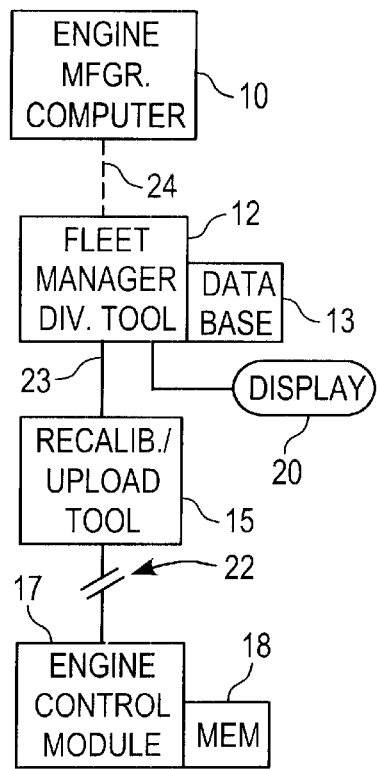
FIG. 1 is a schematic representation of a system for recalibration of an engine control module in accordance with one embodiment of the present invention.

For the purposes of promoting an understanding of the principles of the invention, reference will now be made to preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

The present invention contemplates a system and method for recalibration of an electronic control system, such as an engine control module (ECM). In particular, the invention facilitates automation of the recalibration process, including security authorization checks and data integrity checks.

In one embodiment of the invention, a computer 10 at central location, such as an engine manufacturer's site, is used to generate calibration data for a variety of engines and/or engine applications. For example, a typical engine manufacturer will produce two or more models of internal combustion engines. Each model of engine typically requires a different set of calibrations that control the intake of fuel and air, the combustion timing and other performance aspects of the engine. Each engine may also have different data generation and report generation capabilities. In addition to the many engine models, an engine manufacturer will generally provide the engines for use in a wide range of applications. For example, the same engine can be used in a long-haul or line-haul truck, a fire engine, an off-road construction vehicle, and many other heavy and light duty applications. For each application, the engine may require a different calibration or a different set of trip data. Consequently, engine manufacturers typically generate a selection of engine calibrations to be provided to end-users of the particular engine.

As shown in FIG. 1, one end user is a fleet manager who owns and operates a fleet of vehicles, for example, using the engine manufacturer's engines. In accordance with the invention, the fleet manager has a development tool 12 that is usually a personal computer having an on-board memory storing a database 13 of information concerning the engines. Typically, the fleet manager uses development tool 12 to receive information concerning the performance of the engines in the vehicles of the managed fleet. In accordance with the present invention, developmental tool 12 also enables the fleet manager to recalibrate the engines of certain vehicles, either automatically or with human intervention.

In certain embodiments, this recalibration occurs through the use of a recalibration or upload tool 15. Frequently, this tool is a hand-held apparatus that can transmit and receive information to and from engine control module 17. Engine control module 17 is situated within the particular vehicle. ECM 17 also includes a memory 18 that can store data accumulated from various engine sensors, as well as programs and associated data for controlling the function, and therefore the calibration, of the engine.

The various components of this system shown in FIG. 1 can communicate with other components in a variety of ways. For example, data can be transmitted from recalibration tool 15 to engine control module 17 through a data link 22. Data link 22 can be a variety of types, such as an SAEJ1708 or SAEJ1939 link. Recalibration tool 15 can include a cable, which is plugged into ECM 17. Alternatively, and preferably, data link 22 is a wireless link requiring only that the vehicle T (see FIG. 2) be aligned with recalibration tool 15.

Figure 2:
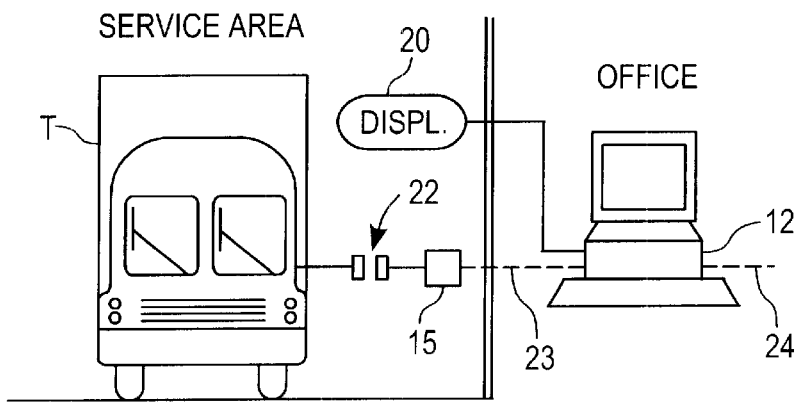
FIG. 2 is a pictorial representation of the environment in which the system shown in FIG. 1 is used.

Data from development tool 12 can be transmitted to recalibration tool 15 over a link 23. Again, link 23 can be of a variety of types. In one embodiment, development tool 12 and recalibration tool 15 are essentially part of the same device. In this instance, data link 22 can be connected to a serial port of developmental tool computer 12 (see FIG. 2). As shown in FIG. 2, developmental tool computer 12 also operates a display 20 that is disposed within the service area in which vehicle T is situated during the upload/download process. In accordance with one embodiment of the present invention, fleet computer 12 controls display 20 to provide the driver of vehicle T with certain information related to the download/upload process.

The final link of the components of the system shown in FIG. 1 is data link 24 between engine manufacturer computer 10 and fleet manager computer 12. This data link 24 can be a variety of types of communication links, such as the SAEJ1708 and SAEJ1939 links discussed above. Data link 24 can also be in the form of a dial-up link, such as communications through the internet, in which information can be accessed at engine manufacturer computer 10 and downloaded to fleet computer 12. Finally, data link 24 also contemplates transferring information through hard media, such as a CD-ROM or floppy disk. The information obtained from engine manufacturer computer 10 can be the variety of engine calibrations established by the engine manufacturer.

Figure 3:
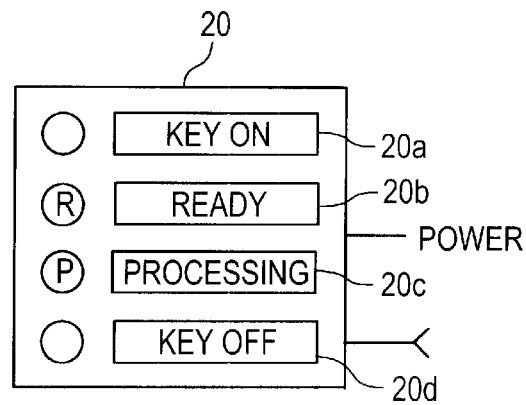
FIG. 3 is a front elevational view of a display used in the environment shown in FIG. 2.

In accordance with the system and method of the present invention, a vehicle, such as truck T, enters a service area as shown in FIG. 2. Data link 22 is established between the ECM onboard the truck T and recalibration tool 15. In the illustrated embodiment, this recalibration tool is linked to office computer 12 of the fleet manager. This office computer includes a database 13 that contains the engine recalibration information previously downloaded from the engine manufacturer. In one embodiment of the invention, fleet manager computer 12 controls a display 20 to instruct the driver of the truck T as to the necessary steps for the download and upload aspects of the invention. One type of display as shown in FIG. 3 which includes an array of visual annunciators 20a–20d. As shown in FIG. 3, display 20 directs the vehicle operator to turn the ignition key on or off, depending upon the step in the processing of information transferred to and from the engine control module. Processing annunciator 20c indicates that the data download and upload is occurring, while the ready annunciator 20b tells the truck operator that the process is complete.

In accordance with the present invention, fleet development computer 12 is loaded with software that automates the download of trip information from the vehicle ECM 17, and the upload of recalibration information to ECM 17. For this purpose, computer 12 preferably includes an Intel™ 386 processor or better, about 32 megabytes of random access memory (RAM), a Windows™ operating system, at least one available parallel port, and at least one available serial port for data communication. A program can be loaded onto computer 12 that can be initiated manually or left in an idle state until initiated by an external trigger. In one specific embodiment, the program remains resident and idle on fleet computer 12 until a truck T enters the service area. At that point, a signal from ECM 17 or recalibration tool 15 can alert fleet computer 12 to the arrival of a vehicle T.

Figure 4:
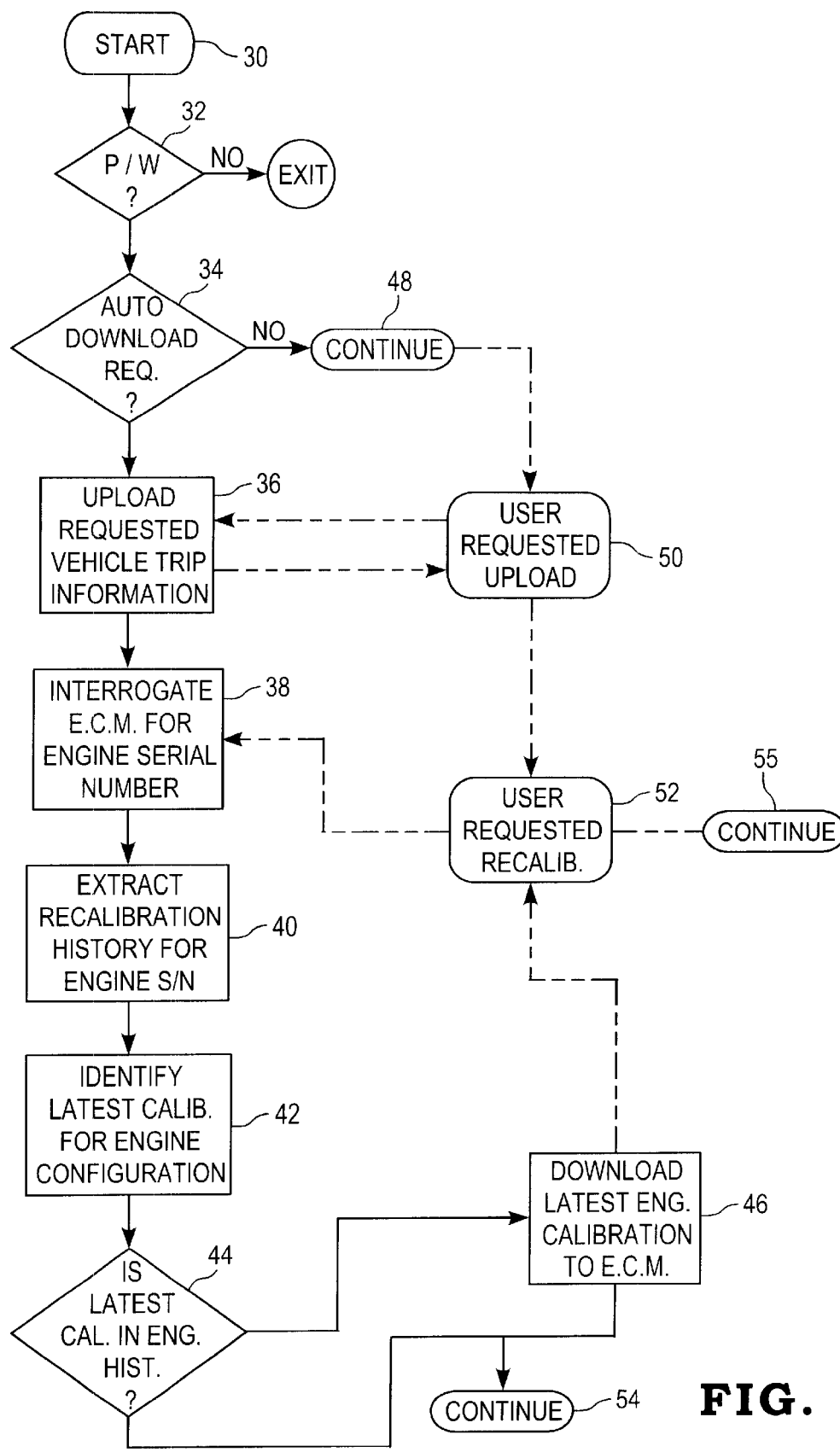
FIG. 4 a flow chart of steps of one method for recalibration of an engine control module in accordance with one embodiment of the present invention.

It is at this point that the software steps of the flow chart of FIG. 4 are instituted. After starting step 30 in which the computer is awakened from its idle mode, a determination can be made in conditional step 32 whether the proper password has been entered by the user of fleet computer 12. If not, then the program automatically exits, since the user is not permitted access to upload or download information to and from ECM 17.

If the proper user password is entered, control passes to conditional step 34. In accordance with one aspect of the present invention, the software routine implemented by fleet computer 12 is capable of automatically conducting data download and upload steps. In conditional step 34 it is ascertained whether the program has been directed to conduct the steps of the method automatically without user intervention. If so, then control passes to step 36 in which vehicle trip information is uploaded that has been requested by the fleet manager. In one aspect of the invention, ECM 17 and particularly memory 18 contains data related to the performance of the engine since the last download. This data can be downloaded from the ECM and stored in database 13 of fleet computer 12 for subsequent evaluation and manipulation by the fleet manager. Preferably, the program implementing the steps of the flow chart shown in FIG. 4 also includes various report generation modules that allows the fleet manager to digest the downloaded trip information and generate various reports and charts indicative of the performance of the particular engine and of the fleet overall.

Once the requested information has been uploaded to fleet computer 12, the next few steps are implemented to download engine recalibration information to ECM 17. In first step 38, the ECM is interrogated to determine the serial number of the engine within which the ECM is installed. Each engine produced by the manufacturer is given a unique engine serial number that distinguishes it from all other engines. The serial number can be loaded in memory 18 of ECM 17 for subsequent access, preferably, the serial number is loaded into the ECM at the engine manufacturer's location, although that serial number can be stored in the ECM memory using recalibration tool 15 under certain circumstances.

Armed with the engine serial number, the software flows to the next step 40 in which the recalibration history of the particular engine is extracted. Preferably, database 13 of fleet computer 12 maintains a complete history of the various calibrations applied to all of the engines within the vehicle fleet. The recalibration history can include entries for various software adjustments to the ECM control software, modifications to fuel injector parameters, and even adjustments to engine condition monitors and sensors. Preferably, database 13 maintains the recalibration history in date order, namely that the database contains an entry for the date of the recalibration as well as the particular recalibration event. In the next step 42, the latest calibration information is identified within the recalibration history. In a specific embodiment, this step 42 simply entails finding the latest date for recalibrations within the history extracted in step 40. In the preferred embodiment, the recalibration history for each engine serial number is maintained in fleet computer 12. Alternatively, ECM 17 itself can store the recalibration history for the particular ECM. In this latter case, the engine recalibration history information can be uploaded from the ECM to fleet computer 12.

In the next step 44, a determination is made as to whether the particular engine has been provided with the latest calibration information. Fleet computer 12 maintains a table in database 13 containing the most recent engine/ECM recalibration information. This table can be created by the fleet manager at fleet computer 12, or it can be downloaded from engine manufacturer computer 10 in the various manners set forth above. For example, if the most recent recalibration involves modifying the data uplink capability of the ECM, the table within fleet computer 12 will identify this change and the corresponding date of the change. Conditional step 44 involves comparing this most recent recalibration information with the latest calibration extracted from the engine recalibration history. If the engine recalibration history reveals that the latest calibration has been implemented, the program exits the upload/download steps and continues at step 54 to other portions of the software routine. However, if the latest calibration information in the recalibration history does not match the latest calibration entry in the table maintained in fleet computer 12, control passes to step 46. In this step, engine/ECM calibration information is downloaded from fleet computer 12 to ECM 17. This downloading can occur directly between computer 12 and ECM, or can occur through recalibration tool 15 as described above.

In accordance with the illustrated embodiments, the recalibration of the ECM can occur according to a variety of protocols. In some cases, the recalibration simply involves modifying various constants that are read by engine control subroutines. In other cases, the calibration information involves modifications to existing software modules or the addition of new software modules to perform further monitoring or controlling functions. Any known means of downloading calibration and recalibration information to an ECM is contemplated to satisfy download step 46 of the present invention. Once the latest engine/ECM calibration information has been downloaded, the program continues at step 54.

Referring back to conditional step 34 in the flow chart of FIG. 4, if an automatic download has not been requested, the program flow can continue at step 48. At this step, the program can pass to other subroutines of the program being executed by fleet computer 12. Alternatively, the program also provides means for user requested data upload or recalibration. For example, in step 50, if the fleet manager requests an upload of vehicle trip information from the vehicle T, the subroutine of step 50 directs control to step 36 to upload the requested information and then return to subroutine 50. Likewise, in the subroutine of step 52, the fleet manager can directly request recalibration of the ECM of the truck T left in the service area. In this instance, the program flow passes to step 38 and continues to step 46, after which control returns to subroutine 52. Once the latest engine/ECM recalibration data has been downloaded, control passes to step 55 to continue with other portions of the software.

As illustrated in FIG. 4, the present invention contemplates a system for automatically determining whether ECM 17 of a particular vehicle T requires recalibration. With this feature, a vehicle can be constantly and readily monitored when pulling into a particular service area. It is contemplated that a vehicle fleet can include a number of service areas throughout the fleet operating range. In this instance, it may be more economical to utilize separate recalibration tools 15 at each service area rather than to provide a fleet manager development tool 12 at each site. In this instance, recalibration tool 15 can include its own memory to receive data from fleet computer 12. Alternatively, recalibration tool. 15 can be connected as a remote device with fleet tool 12, with its operation being directed by the fleet computer. However, most preferably, each service area includes its own fleet computer 12 that can direct the recalibration tool 15 as well as display 20.

As mentioned above, the software implemented by fleet computer 12 can be continuously running. Ideally, the software can enter a sleep mode when no vehicle is in the service area. Once the vehicle T enters the service area, the program can be awakened and prompted to commence the steps as shown in the flow chart of FIG. 4.

Thus, with the present invention, the vehicle operator can be assured that the ECM of the vehicle T will always have the most recent engine/ECM calibration data. The recalibration history for the particular engine serial number can be readily maintained in hard disk memory of fleet computer 12. Each time the ECM of the vehicle T is recalibrated, a new entry is made in the stored recalibration history. Typically, the ECM for a given vehicle T will not require calibration. From the point of view of the present invention, this means that the latest calibration in the table of new calibration information obtained from the central site will be the same as the most recent calibration maintained in the calibration history of fleet computer 12. However, even though the engine ECM is not recalibrated, the routine shown in FIG. 4 will still upload requested vehicle trip information of ECM 17 of the truck T to fleet computer 12.

In a further refinement of the present invention, the recalibration of the ECM includes security authentication/verification checks to ensure that the electronic control system, such as ECM 17, is not subject to unauthorized recalibration. In most engine control modules, a specific password is required to gain access to the control routines and data of the ECM. As with most security systems, the ECM's access passwords are changed on a regular basis to reduce the likelihood of tampering. However, in certain vehicle applications, the vehicle may not enter a service area for quite a while. During that time, the operative password may have changed several times. In that case, issuance of the most recent password will not permit access to the ECM of a long overdue vehicle.

This problem is solved in accordance with the present invention by the provision of a password library. This feature of the invention can be implemented in one embodiment according to the steps shown in the flow chart of FIG. 5. Preferably, these steps form part of a recalibration subroutine that is conducted at step 46 of the flow chart shown in FIG. 4. When a decision is made to download, the latest engine calibration dated to the ECM in step 46, the ECM password library is first downloaded in step 60 from fleet computer 12 to the ECM memory 18. In a typical instance, this password library would simply contain a list of the most recently used passwords, or the passwords used over a predetermined period of time. In that latter case the period of time can be three months, for example, which may entail twelve different passwords if the passwords are changed every week.

Once the password library has been downloaded to the ECM in step 60, a command is issued to the ECM to compare the current passwords already stored within the ECM to each of the passwords within the recently downloaded password library. This comparison can involve a one-to-one comparison until a match is found.

Figure 5:
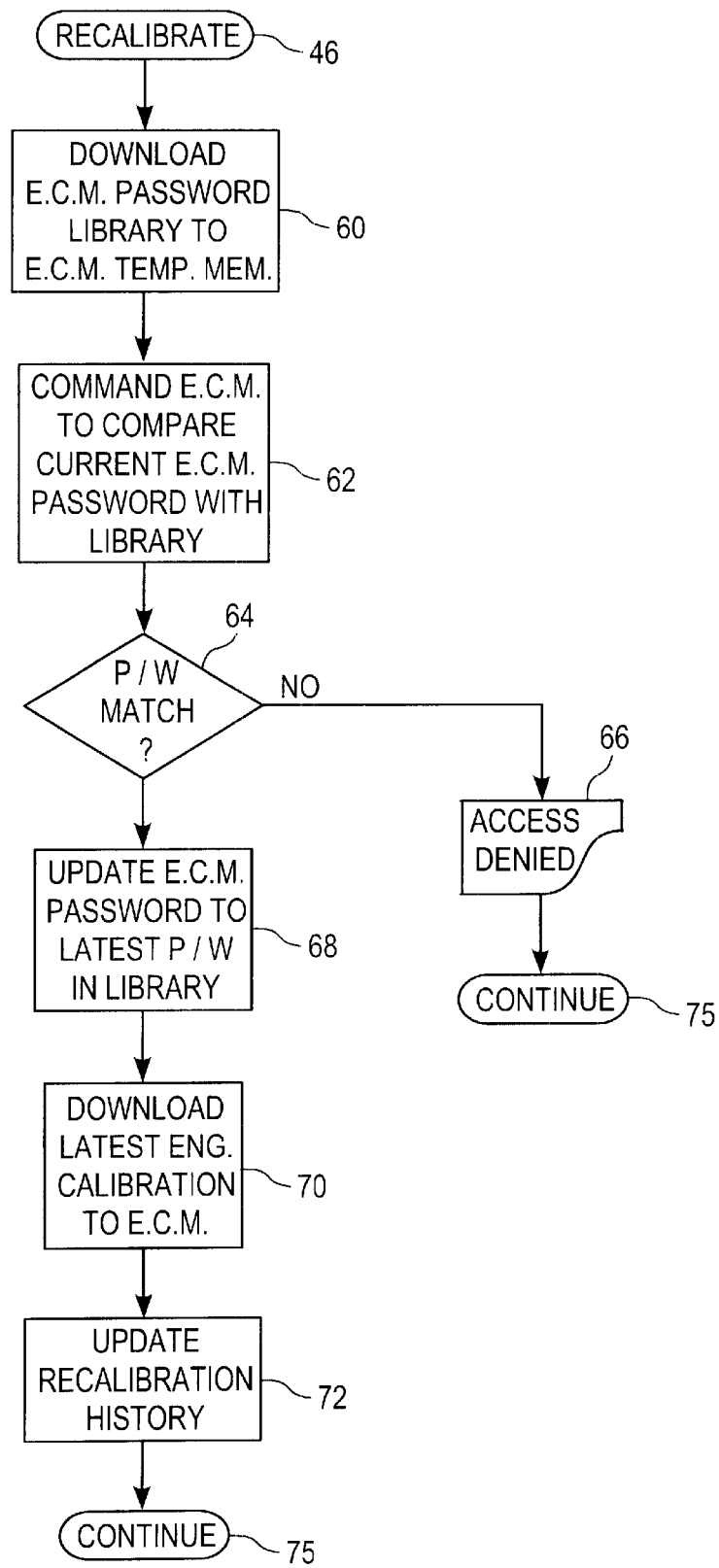
FIG. 5 is a flow chart of steps for downloading engine recalibration information to an ECM forming part of the method shown in FIG. 4.

In the embodiment illustrated in FIG. 5, it is assumed that all of the password verification steps would be conducted by the ECM. However, the same steps can be conducted by fleet computer 12, or even recalibration tool 15. In this instance, step 60 can be modified since there would be no need to download the password library to the ECM temporary memory. In this instance, step 60 would involve uploading of the ECM password from its memory 18 to the temporary memory, or a flash memory, of the recalibration tool or fleet tool 12. A flash memory is preferred because it can be readily erased. Step 62 would be modified to simply conduct the comparison within the recalibration tool or fleet computer, rather than to direct the ECM to make the comparison. Since it is desired to prevent unauthorized modification of the ECM for a particular vehicle, safeguards must be instituted in the event that the ECM password is uploaded from the ECM to a separate computer. In this instance, the flow chart of FIG. 5 can be modified to include a step in which the flash memory is erased to ensure that the ECM password is eliminated from the local computer, especially if no password match is found.

In conditional step 64, it is determined whether the existing ECM password matches any one of the passwords within the password library. If not, then an "access denied" message is provided in step 66 and the program flow continues at step 75.

On the other hand, if the current password within the ECM matches any one of the passwords within the library, control passes to step 68. In this step, the newest password from the password library is downloaded to the ECM. The then existing ECM password is removed and replaced by this latest password. In this way, the password of the ECM is being constantly and automatically updated. This eliminates the need for the fleet manager or the vehicle operator to know the particular password for ECM 17.

Once the password resident with the ECM has been updated in step 68, the engine/ECM calibration information is downloaded in step 70 and the recalibration history for the particular engine is updated in step 72. The program flow continues to other subroutines at step 75.

As suggested above, the password library can consist simply of a list of most recently used passwords. In accordance with the present invention, the list must contain at least two passwords, namely the most recent password and the next most recent password. In this circumstance, all vehicles of the fleet will have either one of the two passwords resident within its ECM. Vehicles that have the next most recent password will eventually require updating to the most recent password within the library.

In cases where the vehicles T are frequently in the service area (FIG. 2) the two password list may be sufficient. However, in cases where the vehicles will not be serviced as regularly, a longer password library is essential. A specific protocol can be adopted for truncated the password library. For example, as suggested above, a particular password can be maintained within the library for a predetermined period of time, such as three months. After three months has expired, the password is erased from the library. A vehicle having a password that does not match one of the library entries can be flagged for detailed inspection by the fleet manager. In this way, the password library and security routine of FIG. 5 can be used to determine whether a vehicle operator has followed a required service regiment. A vehicle with an ECM having an outdated password is automatically suspect and triggered by the routine according to the present invention.

Figure 6:
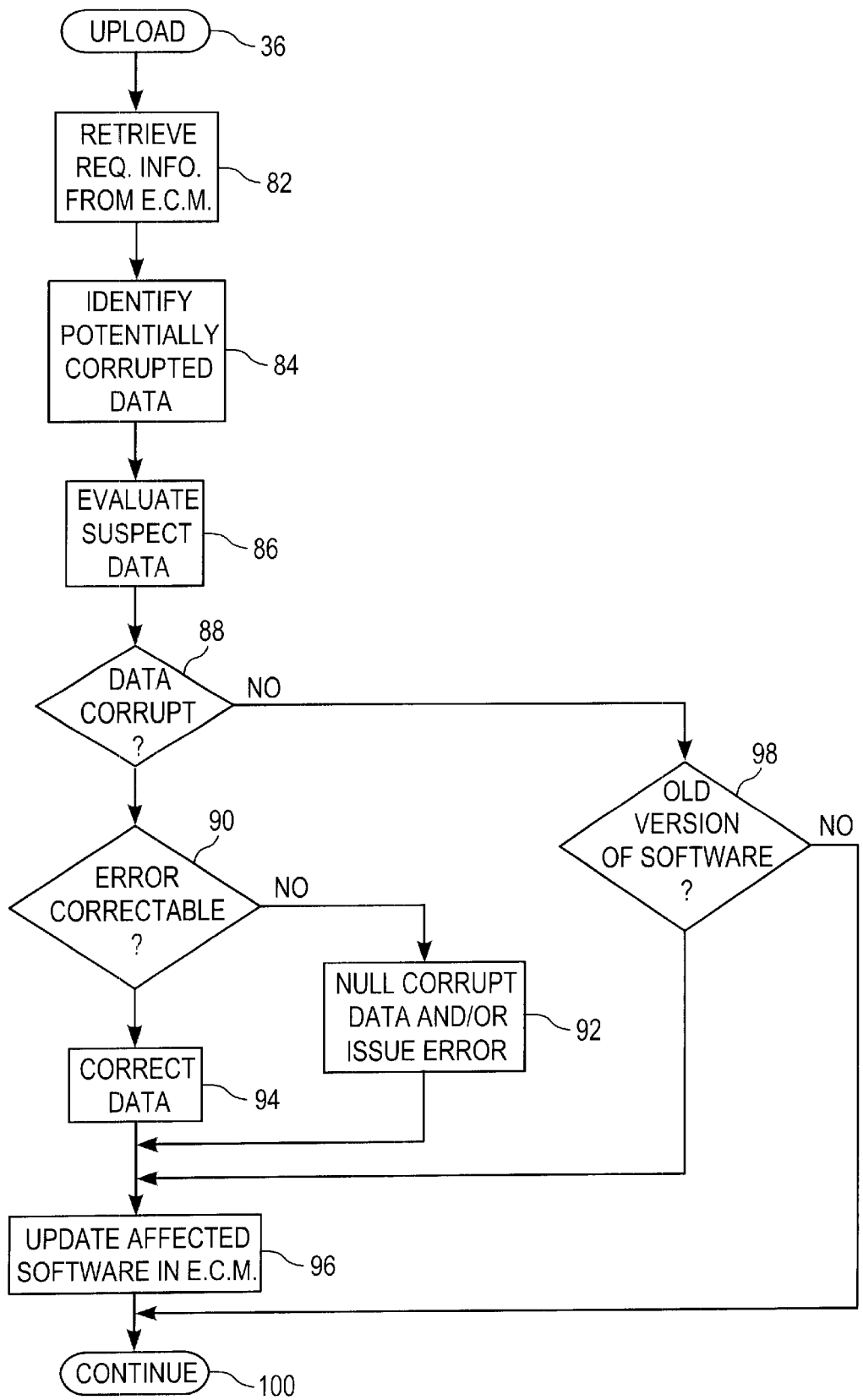
FIG. 6 is a flow chart showing steps for uploading trip information implemented by the method shown in the flow chart of FIG. 4.

A further feature of the present invention is implemented in the uploading of vehicle trip information from an ECM to fleet computer 12. Thus, step 36 shown in FIG. 4 can be implemented by the subroutines shown in flow chart of FIG. 6. As shown in this flow chart, once an upload request has occurred, the identified information is retrieved from the ECM in step 82. This data upload can occur in a conventional manner over data links 22 and/or 23 to fleet computer 12. In the next step 84, the uploaded data is evaluated to determine if it contains potentially corrupted data. In this step, fleet computer 12 contains a database of vehicle trip information that is known to have some problem associated with it. For instance, it may be known that a prior version of data-gathering software resident within an ECM failed to reset the fuel usage counter so that any collected trip mileage information would be incorrect or corrupt. The trip mileage and fuel usage data can be flagged as potentially corrupted, and this flag maintained within fleet computer 12. In step 84, the specifically flagged data can be picked out of the information uploaded from the ECM.

In the next step 86, this suspect data is evaluated to determine whether it is corrupted or legitimate. The evaluation in step 86 can entail a variety of steps, depending upon the nature of the suspect data. In the specific given example, the trip mileage data can be compared to the fuel usage counter based upon an assumed vehicle mileage rate. An estimated fuel usage can be determined using the trip mileage and vehicle mileage rate. If the actual fuel usage is far different from the estimated usage, the suspect data can be identified as corrupt or as having been generated by the incorrect software routine. Other suspect data will require different types of evaluation and comparison. The database of potentially corrupted data can also include the particular evaluation protocols to determine whether the suspect data is actually corrupted.

Depending upon the outcome of the evaluation of step 86, is it determined whether the data is corrupt or not in conditional step 88. If the data is corrupt, then the next conditional step 99 determines whether the error is correctable. For example, in some cases the data error can be corrected using other data that is not known to be inaccurate or corrupt. In the illustrated example, the incorrect fuel usage counter can be corrected based upon the trip mileage and estimated vehicle mileage. On the other hand, certain errors cannot be corrected. One example can be exhaust manifold data that is incorrect and cannot be calculated using other sensor values. Whether or not the particular error is correctable can also be maintained in the database concerning the potentially corrupted data. A database flag can be set if the error can be corrected. If the error cannot be corrected, the program flows to step 92 in which the corrupted data can be nulled and/or an error message issued to alert the fleet manager to the problem.

If the corrupt data listing indicates that the error is correctable, the fix can also be maintained in the database. For correctable errors, the data is fixed in step 94. Regardless of whether the error in the data is correctable, the effected software in the ECM is updated in step 96 to eliminate the occurrence of these errors in future trip information uploads. Returning to conditional step 88, if the data is determined not to be corrupt, a further conditional step 98 is conducted to determine whether the suspect software within the ECM is of the older version or not. If the answer to conditional in step 98 is yes, the software is updated in step 96, if not, then the program control passes to the continuation in step 100.

Figure 7:
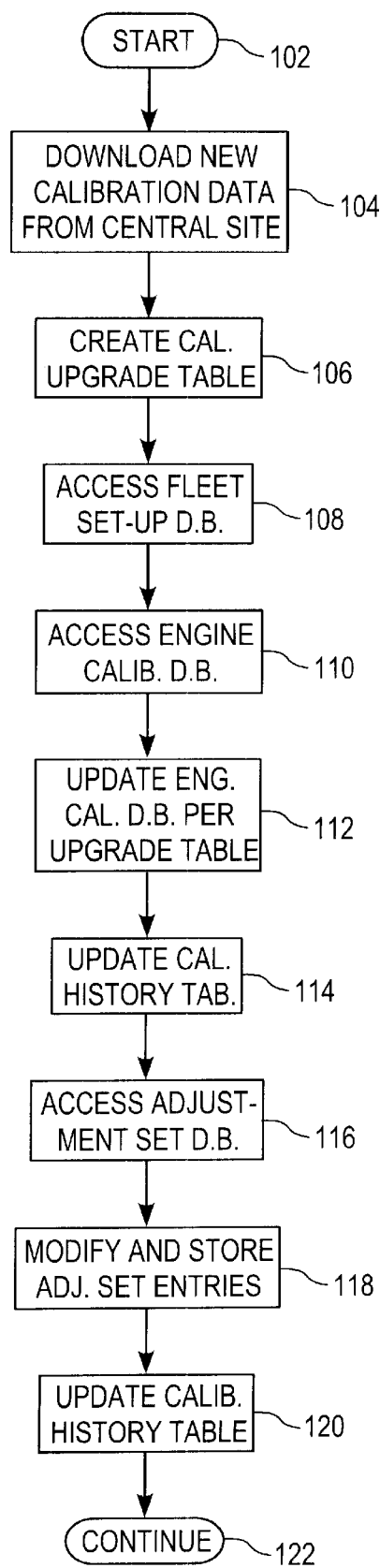
FIG. 7 is a flow chart of steps for generating engine recalibration data.

The fleet manager uses the developmental tool or computer 12 to assess recent re-calibration data and generate data for additional adjustments. Referring to FIG. 7, a flow chart of general administrative steps conducted by the program in the fleet computer 12 is shown. The starting step 102 can occur at any time during the operation of the program. Since it is envisioned that the fleet computer 12 may be constantly monitoring the service area for the arrival of a vehicle T, the fleet manager would typically perform these general administrative steps after a vehicle has been processed, or during "off hours". A first part of the administrative tasks is to download new calibration data from the central location in step 104. As shown in FIG. 1, the central location can be the engine manufacturer's computer 10. However, it is contemplated that the present invention can be applied to other electric controls. For instance, in certain vehicles the transmission itself is electronically control similarly, various other mobile equipments, such as a refrigeration unit, may also have an electronic controller that requires upgraded calibrations. Thus, in the step 104, the fleet manager can access the new calibration data from the appropriate central site. As indicted above, this download process can occur over a data line, through the Internet, or directly from a computer disk.

In the next step 106, the program creates a calibration upgrade table that is referenced during the re-calibration steps depicted in FIGS. 4 and 5. It is contemplated that the calibration upgrade table will identify the particular electronic controller, the date of the calibration, the nature of the re-calibration, and the data necessary to perform the re-calibration.

In one specific embodiment, the fleet manager can the access a fleet set up database in step 108. The fleet setup database includes information for all electronically controlled components within the fleet. For example, a specific fleet may include a plurality of line haul trucks, each having an electronically controlled engine. The fleet may also have a variety of different application vehicles as discussed more fully above. Once the fleet manager opens the fleet set up database, access can be provided to an engine calibration database 110. It is understood that the specific illustrated embodiments involve an ECM, so that an engine calibration database would be maintained at the fleet computer 12. Alternatively, or in addition, other calibration databases can be provided for additional electronically controlled components, such as the transmission mentioned above. Depending upon the nature of the new calibration data, the fleet manager would access the appropriate calibration database. For purposes of illustration, step 110 involves accessing the engine calibration database only.

Once the engine calibration database for the fleet has been opened, the database entries are upgraded pursuant to the calibration upgrade table created from the downloaded calibration data. This engine calibration database is used in the recalibration steps shown in FIGS. 4 and 5. In order to complete the preparation for downloading the new calibration data, the calibration history table for each particular engine or electronic control module is updated. It may be recalled that the calibration history table is the vehicle by which a determination is made as to whether the ECM of the truck T in the service area requires recalibration.

Certain factory-endorsed recalibrations may require adjustments of other related components of the vehicle. For example, certain aspects of the vehicle or engine setup may require modification when an engine is recalibrated. The present invention contemplates that the illustrated program permits the fleet manager to create an adjustment set database. The adjustment set database can include entries for all of the vehicles in the fleet with the particular adjustment data associated with that vehicle. The adjustment set database can include entries that simply effect the collection of trip information for the vehicle. In addition, the adjustment set database can include entries that specifically modify the vehicle or engine performance. In the former case, types of adjustment set information that effects the collection of trip information may include the rear axle ratio for the vehicles speed sensor or the top gear ratio for the transmission. Vehicle performance related information could include a cruise control speed limit setting that restricts the vehicle operators ability to set the cruise control operation.

Referring back to FIG. 7, the fleet manager can access the adjustment set database in step 116 for the particular fleet database opened in step 108. In step 118, various adjustments set entries can be modified or new entries stored. The effected adjustment set entries can be based an evaluation of the new calibration data presented by the engine manufacturer for example. In some cases, the engine manufacturer may provide additional specification information suggesting certain adjustment set modifications. Once the adjustment set has been upgraded in step 118, the calibration history table is also updated in step 120 to reflect these modifications. It is contemplated that a particular vehicle may only have modifications its adjustment set, without commensurate route changes to its calibration information. However, in the most instances, modifications to the adjustment set information will accompany recalibration data. Once all of these steps have been completed, the various databases can be closed and the program directed to continue its monitoring function in step 122.

Figure 8:
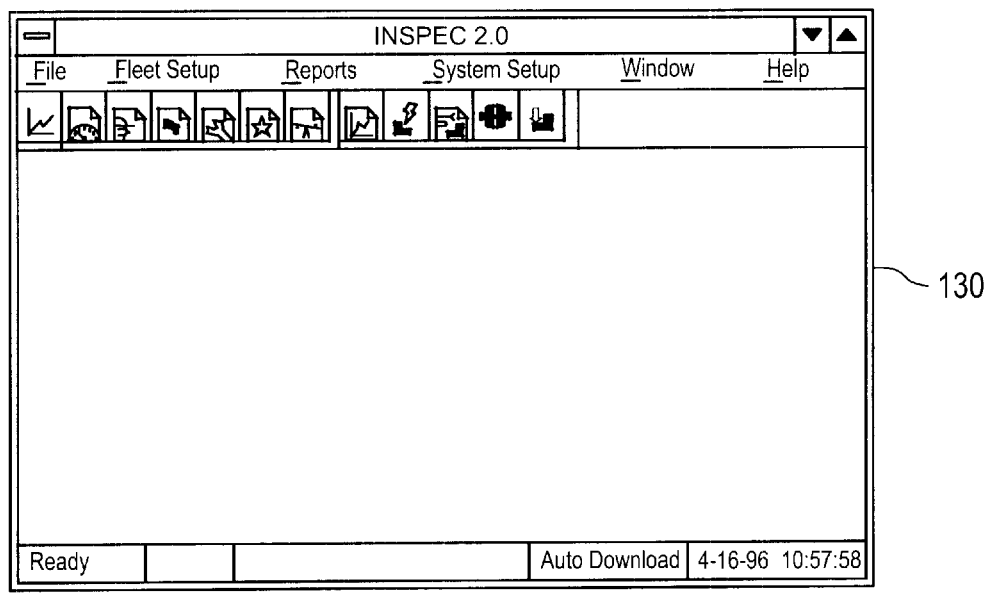
FIG. 8 is a pictorial representation of a screen display for a Windows™-based software routine implementing the steps shown in the flow charts of FIGS. 4–7.

Referring now to FIGS. 8–13, various screen displays are shown that can be implemented by a program in accordance with certain embodiment of the present invention. In FIG. 8, a main screen display 130 is shown. Various pull-down menus can be identified, such as "Fleet Set Up". The steps depicted in the flow chart of FIG. 7 can be initiated by pulling down the "Fleet Set Up" menu which can include specific instructions for downloading calibration data, accessing the fleet set up database and/or accessing and modifying the calibration database or adjustment set entries. The main screen 130 can also include a variety of icons for performing various administrative and report generating functions.

Figure 9:
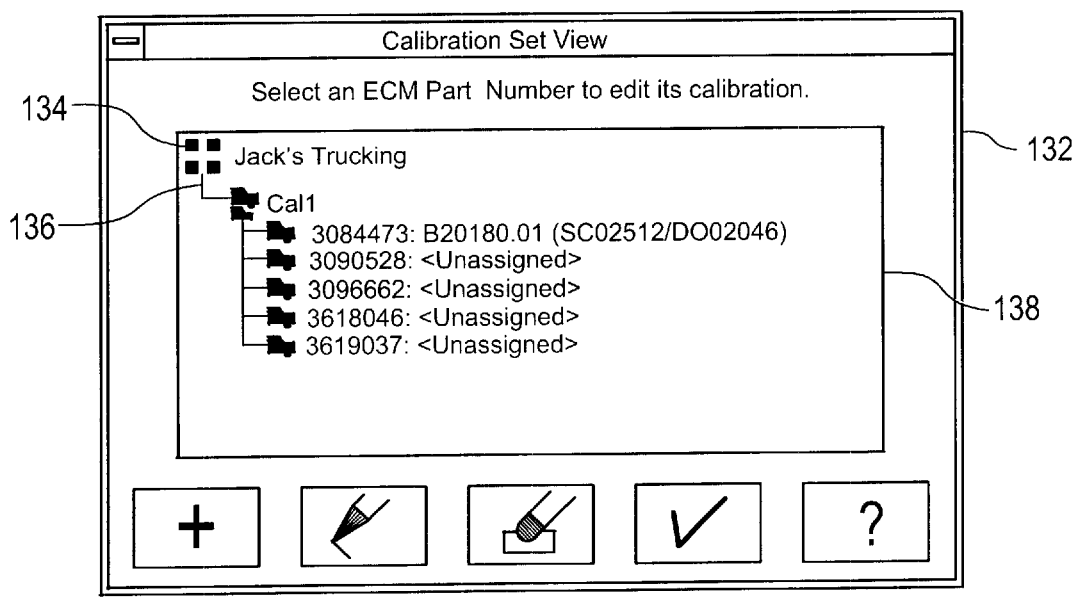
FIG. 9 is a pictorial representation of a further screen display identifying a hierarchy of engine calibration sets.

In step 110 of the flow chart in FIG. 7, the engine calibration database is opened by the fleet manager. FIG. 9 shows one type of screen display that can be created when the engine calibration database is accessed. As shown in FIG. 9, the calibration set screen 132 can include a fleet identifier 134 that identifies a particular fleet being managed. It is contemplated that a single fleet manager may control several different fleets, or may want to segment one fleet into a number of sub-fleets. An additional entry in the calibration set screen 132 is a calibration identifier 136. For each fleet, the manager can provide a variety of calibration sets. In a specific embodiment, each calibration set includes five specific electronic controllers in the group. For example, one electronic controller, or ECM, as a part number 3084473, as now depicted in the entry 138. Each ECM part number in a calibration set can be associated with a particular calibration set, as identified with the prefix B for entry 138. Each calibration set can be associated with a particular software change code (the prefix "SC"), or a dashboard option (the prefix "DO"). Of course, other methods for identifying particular calibrations and associating those calibrations with a specific ECM or electronic controller serial number are contemplated. It will be noted that some of the ECM part numbers do not have any calibrations assigned. These ECM's can simply include the factory installed calibration, or can constitute ECM's that are not presently in vehicles.

Figures 10, 11:
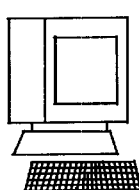
FIG. 10 is a pictorial representation of a screen display generated by the program identified with respect to FIG. 8, in which the screen display illustrates an array of calibration selections.
FIG. 11 is a pictorial representation of a screen display for specific information concerning an engine calibration.

Referring now to FIG. 10, the next screen in the sequence of operation of the software is shown. In accordance with one specific embodiment, the screen display of FIG. 10 is accessed by clicking on one of the ECM calibration entries 138. The screen display 140 in FIG. 10 is a calibration search screen that permits the fleet manager to review all of the calibration entries in the existing database. The calibration search "wizard" allows the fleet manager to select a particular calibration based upon a variety of different entries. Once a calibration is chosen, such as the identified calibration entry 142, the fleet manager can direct that this calibration be assigned to a particular ECM part number. In accordance with one aspect of the invention, once a calibration, such as entry 142, is directed to be assigned to an ECM part number, it is determined whether that particular calibration has itself been updated by the engine manufacturer. If so, the software directs that the upgrade calibration be substituted for the requested calibration, and then assigned to the particular ECM serial number.

As a further aspect of the illustrated embodiment, the calibration search "wizard" allows the fleet manager to view various characteristics for each calibration, such as entry 142. A screen display 144, as shown in FIG. 11, includes a number of tabs at 144a–144d, that can be accessed by the fleet manager. The history tab 144a can be accessed to reveal the calibration history for the particular calibration, as denoted by the entries 146 in FIG. 11. The other tabs reveal additional specific information about each calibration.

Figures 12, 13:
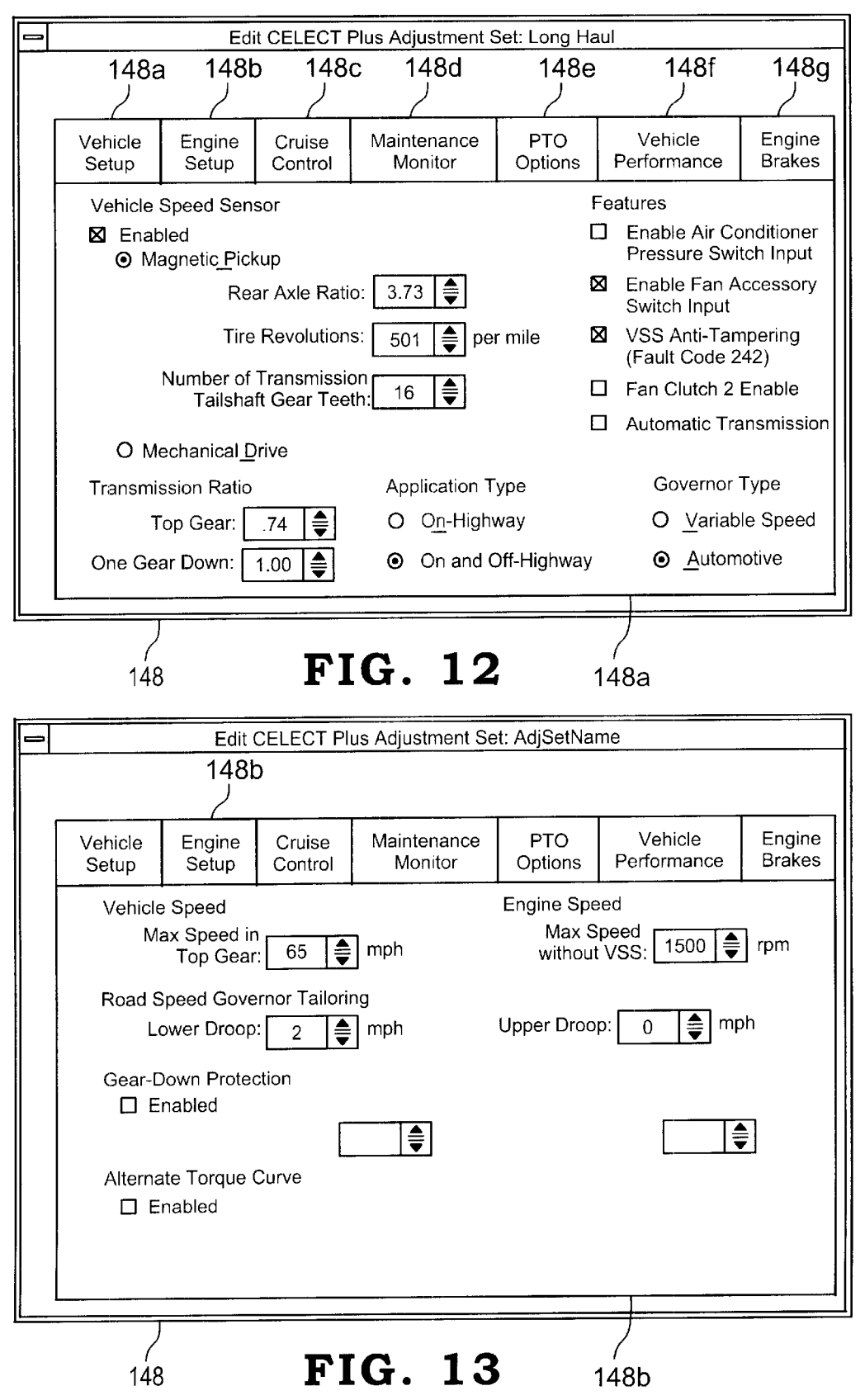

As described in connection with FIG. 7, the fleet manager also has the opportunity to modify certain adjustment sets that effect the performance and/or trip information collection process for a particular engine and/or vehicle. Two such screen displays are shown in FIGS. 12 and 13. Screen display 148 shows one screen of an adjustment set display. This screen includes a number of tabs 148a–148g that can be accessed by the fleet manager to change various pieces of adjustment data. For example, the screen 148a is accessed for viewing specific vehicle set up adjustments. As shown in FIG. 12, the vehicle set up information can include details about the vehicle's speed sensor, transmission ratio and other specific features of the vehicle. Looking now at FIG. 13, the engine set up screen 148B is shown. In this screen, the fleet manager can make adjustments to entries such as the vehicle max speed and top gear. The remaining tabs 148c–148g include similar adjustment data for use of modifying the performance and action of the vehicle and/or engine.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A method for recalibration of a remote electronic control system by a computer separate from the remote electronic control system, comprising the steps of:

transmitting an initiation signal from the remote electronic control system to the computer;

developing a history of recalibrations for the remote electronic control system;

accessing a most recent calibration to be applied to the remote electronic control system;

determining by the computer whether the recalibration history includes the most recent calibration; and if not, recalibrating by the computer the remote electronic control system according to the most recent calibration and updating the recalibration history to include the most recent calibration;

wherein the determining and recalibrating steps are conducted in response to receipt by the computer of the initiation signal.

2. The method for recalibration according to claim 1, further comprising:

assigning a unique serial number to the electronic control system; and wherein the steps of developing a recalibration history and accessing a most recent calibration are correlated to each serial number.

3. The method for recalibration according to claim 1, wherein the step of accessing a most recent calibration includes downloading calibration information from a central site remote from the computer and from the remote electronic control system.

4. The method for recalibration according to claim 1, further comprising the steps of:

assigning an access password to the remote electronic control system;

maintaining a password library of acceptable passwords in a media separate from the remote electronic control system;

prior to the step of recalibrating, comparing the access password to entries in the password library of acceptable passwords and initiating the recalibration only if the access password matches an entry in the password library of acceptable passwords.

5. The method for recalibration according to claim 4, further comprising the steps of:

determining the most recent entry in the password library of acceptable passwords; and updating the access password to the most recent entry if the access password matches an entry in the password library of acceptable passwords.

6. A method for ensuring data integrity for data retrieved from a remote electronic control system comprising the steps of:

generating data with control routines in the remote electronic control system;

independent of the remote electronic control system, identifying types of data that may be corrupted when generated by the control routines;

retrieving the data generated by the remote electronic control system;

determining if the identified types of data are present in the retrieved data; and instituting an error correction procedure if the identified types of data are present.

7. The method for ensuring data integrity according to claim 6, wherein the step of instituting an error correction procedure includes:

identifying a subset of the identified types of data that can be corrected;

determining if the identified types of data present in the retrieved data correspond to the identified subset; and if so, correcting the identified types of data in the retrieved data.

* * * * *